(12) United States Patent
Furuya

(10) Patent No.: US 6,377,451 B1
(45) Date of Patent: Apr. 23, 2002

(54) DOOR MECHANISM HAVING SPRING THAT URGES FIRST AND SECOND DOOR PANELS TOWARD CLOSED POSITIONS

(75) Inventor: Keizo Furuya, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 15 days.

(21) Appl. No.: 09/662,594

(22) Filed: Sep. 14, 2000

(30) Foreign Application Priority Data

Sep. 29, 1999 (JP) .............................. 11-276825

(51) Int. Cl.[7] .................................................. G06F 1/16
(52) U.S. Cl. ....................... 361/686; 361/684; 361/685; 361/754; 360/99.02; 369/77.2
(58) Field of Search ................................ 361/679–686, 361/724–727, 737, 729, 733, 754, 785, 790, 798; 364/708, 708.1; 312/9.2, 9.15, 9.22, 9.26, 270.2, 223.1, 223.2, 362; 360/96.5, 99.02, 99.06, 97.02, 97.03, 133, 137; 369/77.1, 77.2, 291; 340/545.6; 206/307, 308.1, 308.3, 387.1

(56) References Cited

U.S. PATENT DOCUMENTS 4,817,079 A * 3/1989 Covington .................. 369/291
5,299,089 A * 3/1994 Lwee ......................... 361/684
5,559,672 A * 9/1996 Buras et al. ................. 361/684
5,691,860 A * 11/1997 Hoppe ....................... 360/97.02
5,701,216 A * 12/1997 Yamamoto et al. ...... 360/99.02

FOREIGN PATENT DOCUMENTS

JP          408124265 A   *   5/1996   ........... G11B/33/02

* cited by examiner

Primary Examiner—Leo P. Picard
Assistant Examiner—Michael Datskovsky
(74) Attorney, Agent, or Firm—Finnegan, Henderson, Farabow, Garrett & Dunner, L.L.P.

(57) ABSTRACT

A door mechanism comprises a frame having an insertion port and first and second door panels. The first and second door panels have respective pivot shafts rotatably connected to the frame. These door panels are supported by the frame such that they can swing about the respective pivot shafts between closed positions in which they close the insertion port, and open positions in which they open the insertion port. The first and second door panels are swung apart in opposite directions when they are shifted from the respective closed positions to the respective open positions. The first and second door panels are urged by a spring toward the respective closed positions. The spring has a first coil section mounted on the pivot shaft of the first door panel, a second coil section mounted on the pivot shaft of the second door panel, arm sections each extending from one end of a corresponding one of the first and second coil sections and urging the first and second door panels toward the respective closed positions, and a connecting section bridging another end of each of the first and second coil sections.

14 Claims, 10 Drawing Sheets

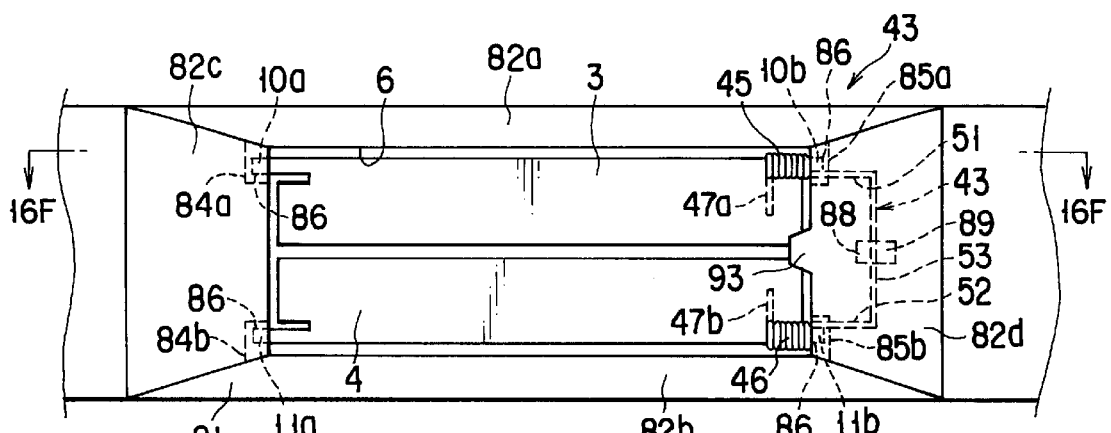
FIG. 15
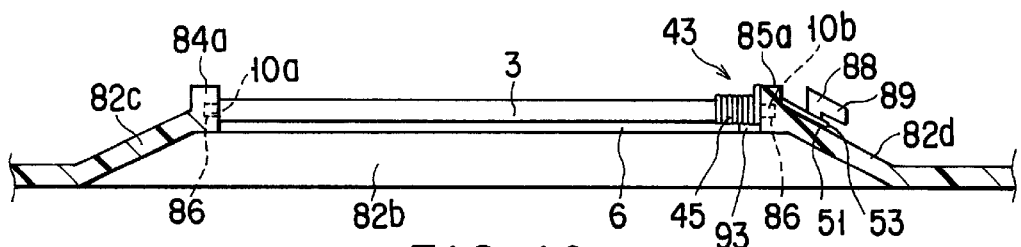
FIG. 16
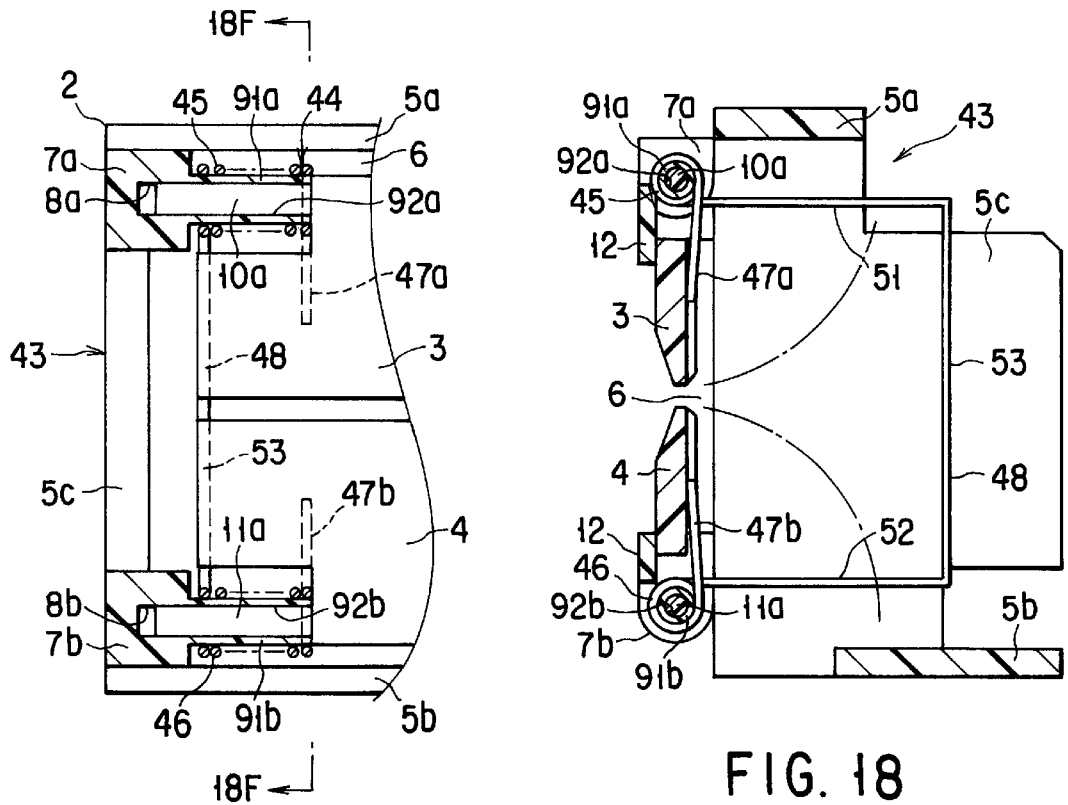
FIG. 17
FIG. 18

DOOR MECHANISM HAVING SPRING THAT URGES FIRST AND SECOND DOOR PANELS TOWARD CLOSED POSITIONS

CROSS-REFERENCE TO RELATED APPLICATIONS

This application is based upon and claims the benefit of priority from the prior Japanese Patent Application No. 11-276825, filed Sep. 29, 1999, the entire contents of which are incorporated herein by reference.

BACKGROUND OF THE INVENTION

This invention relates to a door mechanism for opening and closing a card slot into which a PC card, for example, is inserted, and more particularly to a spring structure urging first and second door panels of the mechanism toward their closed positions.

An electronic apparatus such as a portable computer incorporates a card receptacle for receiving, for example, a PC card. This type of card receptacle has a card slot, which opens to a side surface of the computer. A door mechanism of a shutter type is provided at the card slot for preventing dust, foreign matter, etc. from getting into the card receptacle while a PC card is removed therefrom.

FIGS. 22 to 26 show an example of a conventional door mechanism 1. The door mechanism 1 includes a frame 2 and first and second door panels 3 and 4. The frame 2 has upper and lower walls 5a and 5b and left and right side walls 5c and 5d. The upper and lower walls 5a and 5b extend horizontal and parallel to each other. The side walls 5c and 5d extend vertical and connect the opposed ends of the upper and lower walls 5a and 5b. The walls 5a–5d are joined to form a slim insertion port 6. The insertion port 6 functions as a card slot for inserting and ejecting a PC card 16.

First and second bearings 7a and 7b are formed at front edge portions of the side wall 5c. The first and second bearings 7a and 7b are vertically separated from each other. A third bearing 7c is formed at a front edge portion of the upper wall 5a. The third bearing 7c is opposed to the first bearing 7a at the upper edge of the insertion port 6. A fourth bearing 7d is formed at a front edge portion of the lower wall 5b. The fourth bearing 7d is situated below the third bearing 7c, and opposed to the second bearing 7b at the lower edge of the insertion port 6.

As is shown in FIG. 24, the first to fourth bearings 7a–7d have bearing holes 8a–8d, respectively. The bearing hole 8a of the first bearing 7a is arranged coaxial with the bearing hole 8c of the third bearing 7c, with the insertion port 6 interposed therebetween. The bearing hole 8b of the second bearing 7b is arranged coaxial with the bearing hole 8d of the fourth bearing 7d, with the insertion port 6 interposed therebetween.

The first and second door panels 3 and 4 are made of an elastically deformable synthetic resin, and formed of slim plate-like members extending along the insertion port 6. The first and second door panels 3 and 4 are arranged vertical inside the insertion port 6.

The first door panel 3 is situated between the first and third bearings 7a and 7c, and has first and second end portions separated from each other along the length of the insertion port 6. The first end portion has a first pivot shaft 10a projecting to the first bearing 7a, while the second end portion has a second pivot shaft 10b projecting to the third bearing 7c. The first pivot shaft 10a is fitted in the bearing hole 8a of the first bearing 7a such that it can pivot axially. The second pivot shaft 10b is fitted in the bearing hole 8c of the third bearing 7c such that it can pivot axially. Thus, the first door panel 3 is supported by the frame 2 such that it can pivot on the first and second pivot shafts 10a and 10b between a closed position in which the upper half space of the insertion port 6 is closed, and an open position in which the upper half space of the insertion port 6 is open.

The second door panel 4 is situated between the second and fourth bearings 7b and 7d, and has first and second end portions separated from each other along the length of the insertion port 6. The first end portion has a first pivot shaft 11a projecting to the second bearing 7b, while the second end portion has a second pivot shaft 11b projecting to the fourth bearing 7d. The first pivot shaft 11a is fitted in the bearing hole 8b of the second bearing 7b such that it can pivot axially. The second pivot shaft 11b is fitted in the bearing hole 8d of the fourth bearing 7d such that it can pivot axially. Thus, the second door panel 4 is supported by the frame 2 such that it can pivot on the first and second pivot shafts 11a and 11b between a closed position in which the lower half space of the insertion port 6 is closed, and an open position in which the lower half space of the insertion port 6 is open.

As is shown in FIG. 22 or 25, where the first and second door panels 3 and 4 are in their closed positions, they stand straight, are situated in a single vertical plane, and appear in the insertion port 6. On the other hand, where the first and second door panels 3 and 4 are in their open positions, they are folded substantially horizontally along the upper and lower walls 5a and 5b of the frame 2, and are retreated from the insertion port 6.

The first and second bearings 7a and 7b each have a stopper 12. The stoppers 12 are brought into contact with the first and second door panels 3 and 4 when the panels are swung from their open positions to their closed positions, thereby limiting an excessive movement thereof.

The first and second door panels 3 and 4 are urged toward their closed positions by means of respective helical torsion springs 13. As shown in FIG. 26 or 27, each helical torsion spring 13 has a coil section 14, a first arm section 15a and a second arm section 15b. The coil section 14 is formed by tightly winding a metal strand. The first arm section 15a radially extends from an end of the coil section 14. The second arm section 15b tangentially extends from the other end of the coil section 14. When the helical torsion spring 13 is viewed from a direction along the axis of the coil section 14, as is shown in FIG. 25, the first and second arm sections 15a and 15b extend in different circumferential directions of the coil section 14. The angle-of-twist θ of the helical torsion spring 13, determined by the arm sections 15a and 15b, is set at about 100° or more when the spring 13 is in a free state in which no load is applied thereto.

The first and second door panels 3 and 4 are designed to pivot in opposite directions. Accordingly, the helical torsion springs 13 incorporated in the first and second door panels 3 and 4 have windings wound in opposite directions.

More specifically, as shown in FIG. 24, in the first door panel 3, the coil section 14 of the helical torsion spring 13 is mounted on the circumference of the first pivot shaft 10a. The coil section 14 is mounted on the pivot shaft 10a such that first arm section 15a extends downward from the shaft 10a in contact with the reverse surface of the first door panel 3. Further, the second arm section 15b extends from the first pivot shaft 10a in a direction perpendicular to the first door panel 3, and has its tip hooked on the upper wall 5a of the frame 2.

In the second door panel 4, the coil section 14 of the helical torsion spring 13 is mounted on the circumference of the second pivot shaft 11b. The coil section 14 is mounted on the pivot shaft 11b such that first arm section 15a extends upward from the shaft 11b in contact with the reverse surface of the second door panel 4. Further, the second arm section 15b extends from the second pivot shaft 11b in a direction perpendicular to the second door panel 4, and has its tip hooked on the lower wall 5b of the frame 2.

Where the helical torsion springs 13 are incorporated in the first and second door panels 3 and 4 as shown in FIGS. 23 to 26, each first arm section 15a is urged in a direction in which the coil section 14 is tightened. In this state, the angle-of-twist θ determined by the arm sections 15a and 15b is reduced. Accordingly, each coil section 14 generates a repulsive force to return the corresponding first arm section 15a to its original position, thereby swinging the first and second door panels 3 and 4 until they are brought into contact with the stoppers 12. As a result, the first and second door panels 3 and 4 are kept in their closed positions.

When the first and second door panels 3 and 4 have been swung from their closed positions to their open positions, the first arm sections 15a are urged more than before, and hence the angle-of-twist θ becomes a value close to 0, thereby increasing the repulsive forces of the coil sections 14. These increased repulsive forces serve as restoring forces for restoring the door panels 3 and 4 from the open positions to the closed positions.

When the PC card 16 is not inserted in the card receptacle, the first and second door panels 3 and 4 are kept in their closed positions as shown in FIG. 22 or 25. When the front end of the PC card 16 has been urged against the first door panel 3 to insert it into an upper stage of the card receptacle, the first door panel 3 is swung against the repulsive force of the helical torsion spring 13, and retreated into the insertion port 6. Thus, the insertion port 6 is opened, through which the PC card 16 is pushed into the card receptacle. The first door panel 3 is kept in the open position by the PC card 16.

Further, when the PC card 16 has been taken out of the insertion port 6 by an ejecting operation, the first door panel 3 is automatically restored from the open position to the closed position by the repulsive force of the helical torsion spring 13. This means that the first door panel 3 automatically closes the insertion port 6.

In the door mechanism 1 constructed as above, the first and second door panels 3 and 4 are incorporated in the frame 2 with their respective helical torsion springs 13 mounted thereon.

The procedure of assembly of the first and second door panels 3 and 4 will be described with reference to the aforementioned figures and FIG. 28. First, the coil section 14 of the helical torsion spring 13 is mounted on the first pivot shaft 10a of the first door panel 3. Subsequently, while holding the coil section 14 with the fingertips to prevent it from rotating unintentionally, the first pivot shaft 10a is inserted into the bearing hole 8a of the first bearing 7a, so that the first arm section 15a will face the reverse surface of the first door panel 3. The insertion of the first pivot shaft 10a is executed with the first door panel 3 protruding in front of the corresponding stopper 12 of the frame 2, so that the frame 2 and the stoppers 12 will not interrupt the inserting operation.

After that, the first door panel 3 is pushed toward the side wall 5c, and is forcibly bent while taking care not to disengage the first pivot shaft 10a from the bearing hole 8a. By bending the panel 3, the distance between the first and second pivot shafts 10a and 10b is temporarily narrowed to thereby fit the second pivot shaft 10b in the bearing hole 8c of the third bearing 7c.

Lastly, the first door panel 3 is pushed into the insertion port 6, and then forcibly swung so as to pass the stopper 12. As a result of the swinging operation, the first arm section 15a of the helical torsion spring 13 is caught on the reverse surface of the first door panel 3, and the second arm section 15b is caught on the upper wall 5a. Accordingly, the helical torsion spring 13 is mounted on the first pivot shaft 10a in a state in which it is tightened. The repulsive force of the spring 13 keeps the first door panel 3 in the closed position.

After finishing the assembly of the first door panel 3, the coil section 14 of another helical torsion spring 13 is mounted on the second pivot shaft 11b of the second door panel 4, thereby executing a procedure similar to the above to attach the second door panel 4 to the frame 2. Thus, the first and second door panels 3 and 4 are swingably attached to the frame 2 by repeating the same operation twice.

As described above, in the conventional door mechanism 1, the helical torsion springs 13 that urge the first and second door panels 3 and 4 toward their closed positions are manually attached to the first and second pivot shafts 10a and 11b of the first and second door panels 3 and 4, respectively.

In the manual attachment, the first and second door panels 3 and 4 are designed to pivot in opposite directions, and therefore the helical torsion springs 13 must be attached to the panels 3 and 4 in opposite directions. This being so, when mounting the helical torsion springs 13 onto the first and second pivot shafts 10a and 11b of the first and second door panels 3 and 4, it is necessary to execute assemblage while taking great care of the winding directions of the first and second arm sections 15a and 15b of each helical torsion spring 13. This inevitably reduces the efficiency of assemblage, and time and effort are required for the assemblage of the first and second door panels 3 and 4 including the helical torsion springs 13.

Moreover, the helical torsion spring 13 is an extremely small member. Therefore, even if the helical torsion springs 13 are mounted on the first and second pivot shafts 10a and 11b in wrong directions, it is very possible that this will not be known and will interrupt the assemblage.

In addition, since the helical torsion spring 13 is very small, great care must be taken when handling it, and/or a tool such as forceps must be required. Thus, time and effort are necessary in handling the helical torsion spring 13 itself. This also reduces the efficiency of assemblage.

Furthermore, since the helical torsion spring 13 has first and second arm sections 15a and 15b leading from the opposite ends of the coil section 14, if, in particular, multiple helical torsion springs are prepared in one place, they will easily be entangled. In such a case, complicated work, for example, separation of tangled springs by manual labor, may be required before attaching the helical torsion springs 13 to the first and second door panels 3 and 4. During such separation work, it is possible that the helical torsion springs 13 will spring apart, with the result that some will be lost or deformed.

Also, as described above, the coil sections 14 of the helical torsion springs 13 are mounted on the first and second pivot shafts 10a and 11b of the first and second door panels 3 and 4, and then the shafts 10a and 11b must be inserted into the bearing holes 8a and 8c while holding the coil sections 14 with the fingertips so as not to move them. If, at this time, the first and second pivot shafts 10a and 11b are disengaged from the bearing holes 8*a* and 8*c,* the assemblage must be again executed from the beginning. Further, it is possible that the helical torsion springs 13 will be dismounted from the first and second pivot shafts 10*a* and 11*b* and fly off because of their force of tension.

In summary, in the prior art, it is necessary to simultaneously execute both the operation of pressing the small helical torsion spring 13 with the fingertips so as to arrange the first and second arm sections 15*a* and 15*b* in correct directions, and the operation of inserting, into the bearing holes 8*a* and 8*c,* the first and second pivot shafts 10*a* and 11*b* with the helical torsion springs 13 mounted thereon. This requires concentration and/or skill, and is the greatest cause of degrading the efficiency of assemblage of the first and second door panels 3 and 4.

BRIEF SUMMARY OF THE INVENTION

It is the object of the invention to provide a door mechanism in which springs for urging first and second door panels in their closed positions can be attached easily, thereby increasing the efficiency of assemblage of the first and second door panels.

According to an aspect of the invention, there is provided a door mechanism comprising: a frame having an insertion port; first and second door panels each having a pivot shaft connected to the frame such that the pivot shaft can rotate about an axis thereof, the first and second door panels being supported by the frame such that they can swing about the respective pivot shafts between closed positions in which the first and second door panels are situated in a single plane and close the insertion port, and open positions in which the first and second door panels open the insertion port, the first and second door panels being swung apart in opposite directions when they are shifted from the respective closed positions to the respective open positions; and a spring urging the first and second door panels toward the respective closed positions. The spring is characterized by including a first coil section mounted on the pivot shaft of the first door panel, a second coil section mounted on the pivot shaft of the second door panel, arm sections each extending from one end of a corresponding one of the first and second coil sections and urging the first and second door panels toward the respective closed positions, and a connecting section bridging another end of each of the first and second coil sections.

Since, in the above structure, the connecting section of the spring project around the first and second coil sections, it can be easily held with the fingertips. Moreover, the connecting section limits the rotation of the first and second coil sections, and hence the arm sections of the spring can be appropriately positioned with respect to the first and second door panels.

Therefore, the spring can be handled without any problem of deformation or loss thereof, and the efficiency of attaching the spring and the first and second door panels to the frame can be significantly improved.

Furthermore, in the above structure, the spring is a single structure that connects the first and second door panels. Accordingly, the number of the component parts of the door mechanism and the number of the processes of assembling the door mechanism can be reduced as compared with the conventional case where a helical torsion spring is necessary for each door panel.

According to another aspect of the invention, there is provided a door mechanism comprising: a frame having an insertion port and a plurality of bearings provided at edge portions of the insertion port; first and second door panels having respective pivot shafts supported by the bearings of the frame such that the pivot shafts can rotate about axes thereof, the first and second door panels being supported by the frame such that they can swing about the respective pivot shafts between closed positions in which the first and second door panels are situated in a single plane and close the insertion port, and open positions in which the first and second door panels open the insertion port, the first and second door panels being swung apart in opposite directions when they are shifted from the respective closed positions to the respective open positions; and a spring urging the first and second door panels toward the respective closed positions. The bearings of the frame have respective cylindrical hollow bosses in which the pivot shafts are inserted such that they can rotate about axes thereof. The spring is characterized by including first and second coil sections mounted on a circumference of the bosses, arm sections each extending from one end of a corresponding one of the first and second coil sections and urging the first and second door panels toward the respective closed positions, and a connecting section bridging another end of each of the first and second coil sections.

In the above structure, the first and second coil sections are mounted on the circumferences of the bosses formed at the bearings of the frame. Further, the first and second coil sections are connected by the connecting section, and hence the rotation of the first and second coil sections can be limited. This means that the arm sections of the spring can be appropriately positioned with respect to the first and second door panels.

Accordingly, the spring can be held on the frame before inserting the pivot shafts of the first and second door panels into the bearings of the frame. This enables individual execution of the positioning of the spring and the insertion of the pivot shafts. As a result, it is sufficient if the pivot shafts of the first and second door panels are inserted into the bosses on which the first and second coil sections are mounted. In other words, the above structure does not require the conventional complicated and troublesome operation of inserting the pivot shafts into the bearings while pressing the helical torsion springs with the fingertips.

Thus, the spring can be handled without any problem of deformation or loss thereof, and the efficiency of attaching the spring and the first and second door panels to the frame can be significantly improved.

Furthermore, in the above structure, the spring is a single structure that connects the first and second door panels. Accordingly, the number of the component parts of the door mechanism and the number of the processes of assembling the door mechanism can be reduced as compared with the conventional case where a helical torsion spring is necessary for each door panel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 is a front view illustrating a door mechanism according to a fourth embodiment;

FIG. 16 is a sectional view taken along line 16F—16F of FIG. 15;

FIG. 17 is a sectional view of a door mechanism according to a fifth embodiment, illustrating a state in which a spring and first and second door panels are attached to a frame;

FIG. 18 is a sectional view taken along line 18F—18F of FIG. 17;

DETAILED DESCRIPTION OF THE INVENTION

Referring to FIGS. 1–8, a portable computer to which a first embodiment of the invention is applied will now be described in detail.

Figure 1:
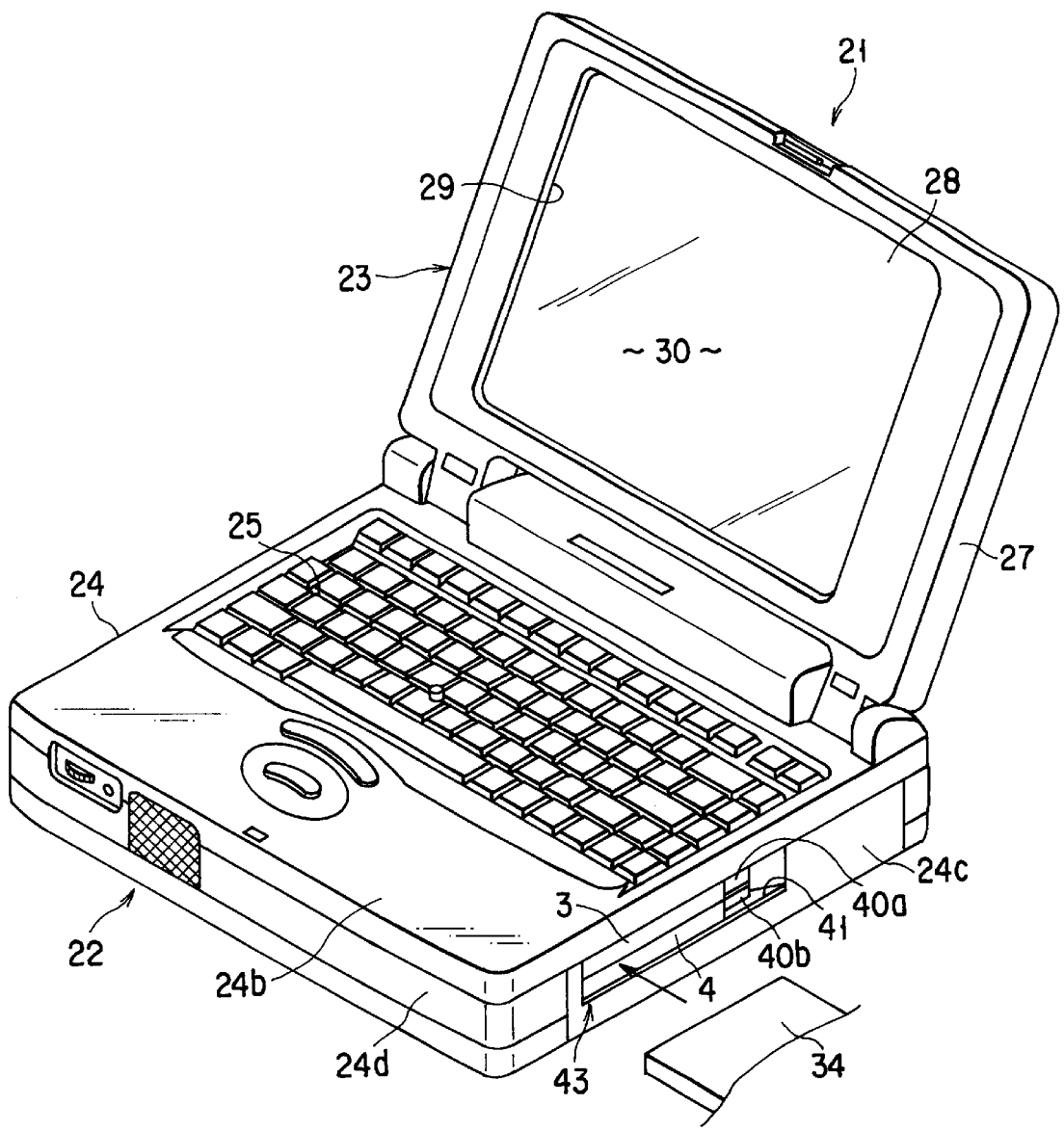
FIG. 1 is a perspective view illustrating a portable computer according to a first embodiment of the invention.

FIG. 1 shows a notebook-type portable computer 21. The portable computer 21 comprises a computer main body 22, and a display unit 23 connected to the main body 22.

The computer main body 22 has a flat box-shaped housing 24. The housing 24 includes a bottom wall 24a, an upper wall 24b, left and right side walls 24c and a front wall 24d. A keyboard 25 is provided on the upper wall 24b of the housing 24.

The display unit 23 includes a flat box-shaped display housing 27, and a liquid crystal display unit 28 contained in the display housing 27. The display housing 27 has a front surface having an opening 29. The liquid crystal display unit 28 has a display screen 30 for displaying information such as letters, figures, etc. The display screen 30 is exposed to the outside of the display housing 27 through the opening 29.

The display housing 27 is attached to a rear end portion of the housing 24 by means of a hinge device (not shown). Accordingly, the display unit 23 can swing between its closed position in which it covers the keyboard 25 from above, and its open position in which it stands in the rear of the keyboard 25.

Figure 2:
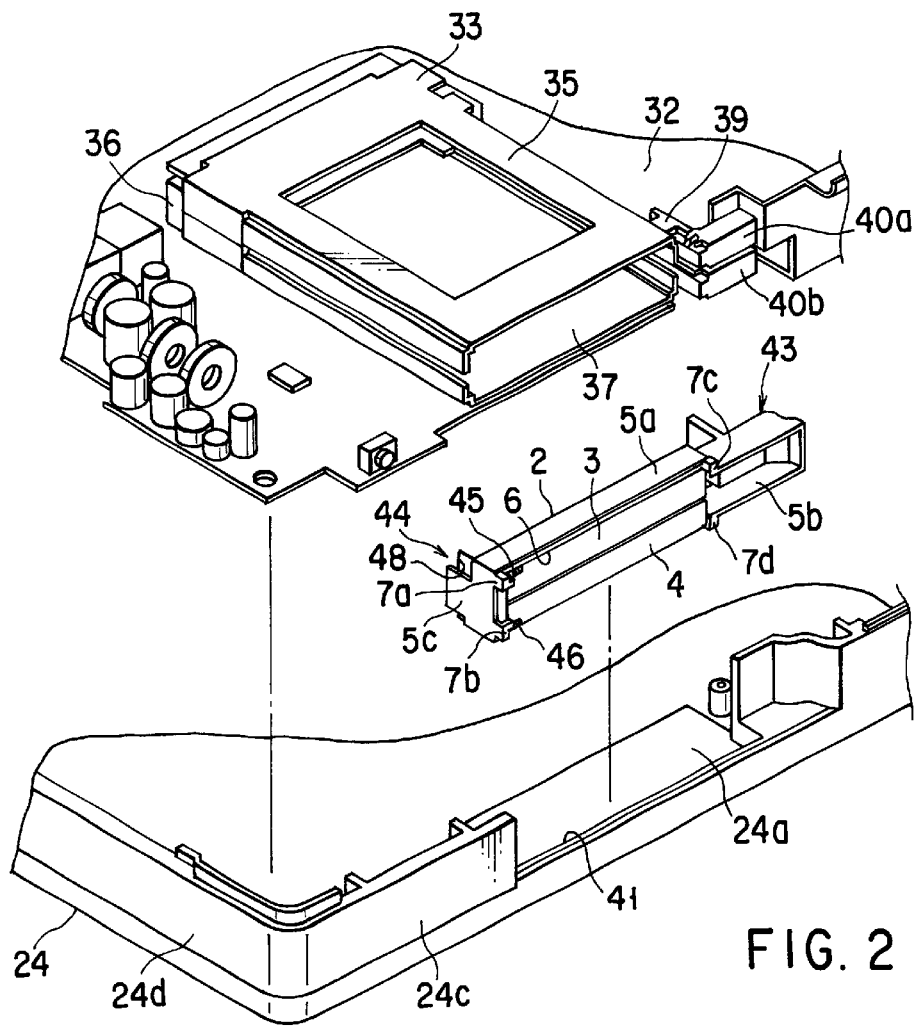
FIG. 2 is a perspective view of the portable computer according to the first embodiment, illustrating the positional relationship between a card slot, a door mechanism and a card holder.
Figure 3:
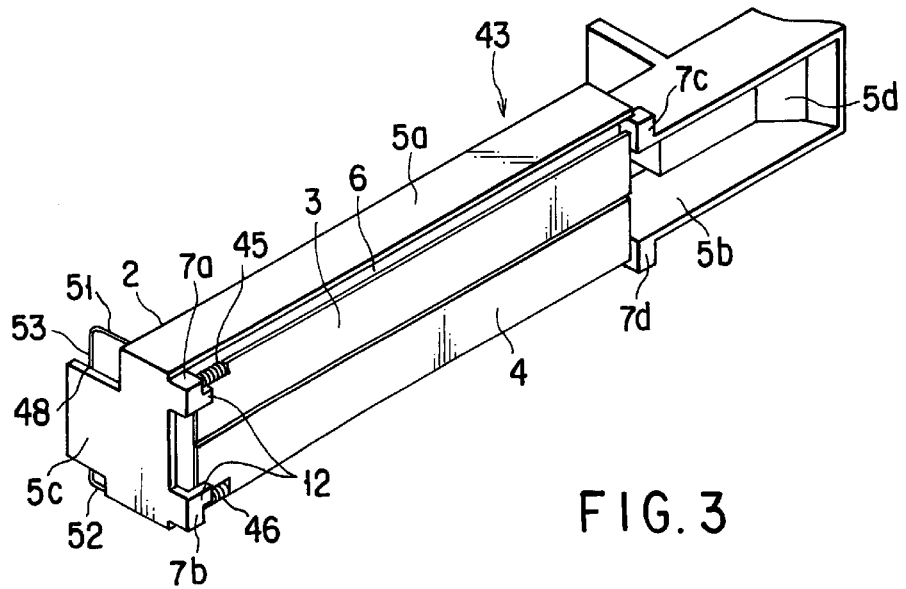
FIG. 3 is a perspective view illustrating the entire structure of the door mechanism according to the first embodiment.
Figure 4:
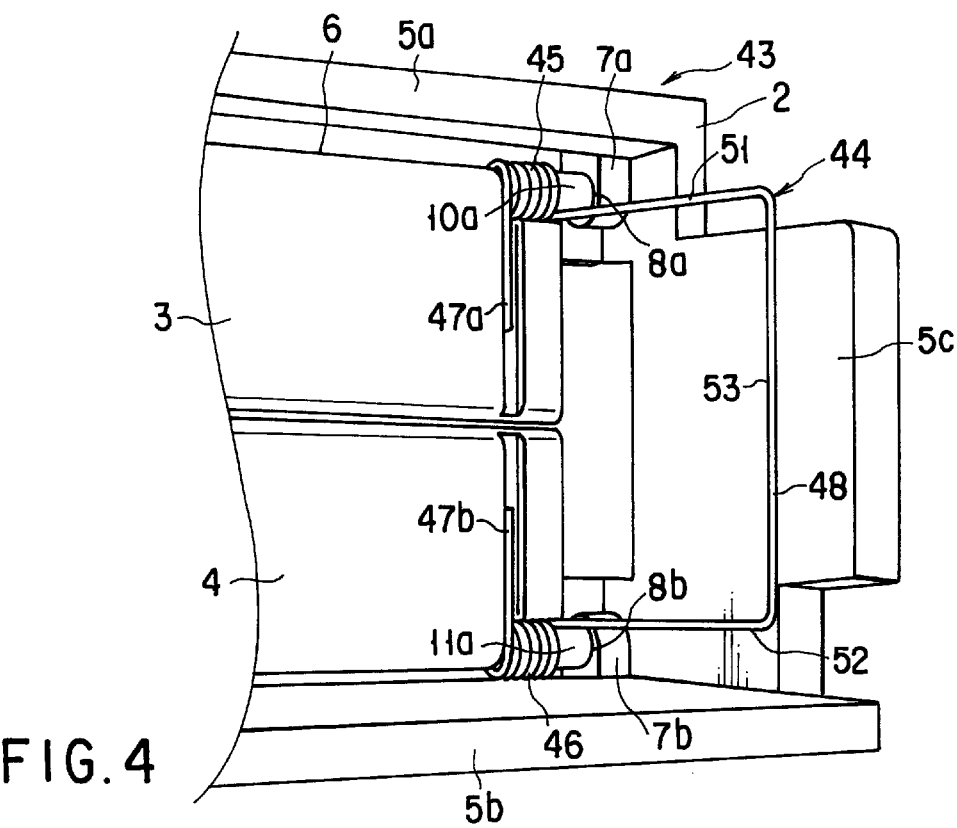
FIG. 4 is a perspective view of the door mechanism according to the first embodiment, illustrating a state in which a spring and first and second door panels are attached to a frame.

As shown in FIG. 2, the housing 24 contains a circuit board 32. The circuit board 32 is screwed to the bottom wall 24a of the housing 24. A card holder 33 is provided on the upper surface of the circuit board 32. The card holder 33 can detachably hold two PC cards 34 as insertion articles, and is contained in the housing 24. The card holder 33 has a size that permits two PC cards 34 to be received therein in two stages.

The card holder 33 includes a case 35, and a card connector 36 provided at an end of the case 35. The case 35 is box-shaped and has an opening 37 for mounting and dismounting the PC cards 34 into and out of the case therethrough. The card connector 36 is opposed to the opening 37, and each PC card 34 is disconnectably connected to the card connector 36.

The case 35 has an ejector 39 for ejecting each PC card 34. The ejector 39 includes a pair of operation levers 40a and 40b to be operated manually. The operation levers 40a and 40b are located vertically at the side of the opening 37.

As shown in FIG. 2, the opening 37 of the case 35 is opposed to a card insertion port 41 formed in the right-hand side wall 24c of the housing 24. A door mechanism 43 according to the invention is provided between the opening 37 of the case 35 and the card insertion port 41. The door mechanism 43 has a basic structure similar to the conventional door mechanism 1. Specifically, the door mechanism 43 differs from the conventional door mechanism 1 only in that the former uses a spring 44 urging the first and second door panels 3 and 4 toward their closed positions, which differs in structure from a corresponding spring employed in the latter. The structures of the other elements, i.e. the frame 2 and the first and second door panels 3 and 4, are similar between the door mechanisms 43 and 1. Therefore, in the following description concerning the door mechanism 43, similar elements to those of the conventional door mechanism 1 are denoted by corresponding reference numerals, and no detailed description will be given thereof.

As shown in FIG. 2, the frame 2 of the door mechanism 43 is screwed to the bottom wall 24a of the housing 24 such that it is situated inside the card insertion port 41. The insertion port 6 of the frame 2 communicates with the card insertion port 41 and the opening 37 of the card holder 33. Accordingly, the first door panel 3 is situated corresponding to an upper half of the card insertion port 41, while the second door panel 4 is situated corresponding to a lower half of the card insertion port 41. Further, the operation levers 40a and 40b of the ejector 39 are exposed to the outside of the housing 24 through the card insertion port 41 at locations adjacent to the first and second door panels 3 and 4.

As is shown in FIGS. 3 to 7, the spring 44 is mounted on an end portion of the first pivot shaft 10a of the first door panel 3 and on a corresponding end portion of the first pivot shaft 11a of the second door panel 4, thereby bridging the shafts. Thus, the location of the spring 44 is at one side of the first and second door panels 3 and 4. The spring 44 has first and second coil sections 45 and 46, first and second arm sections 47a and 47b, and a connecting section 48. The first and second coil sections 45 and 46, the first and second arm sections 47a and 47b, and the connecting section 48 are formed by winding and bending a single metal strand, and constitute a continuous structure.

The first and second coil sections 45 and 46 are formed by tightly winding the metal strand. The first coil section 45 has a diameter that enables attachment thereof on the first pivot shaft 10a of the first door panel 3. Similarly, the second coil section 46 has a diameter that enables attachment thereof on the first pivot shaft 11a of the second door panel 4.

The first arm section 47a tangentially extends from an end of the first coil section 45. To urge the first door panel 3 toward its closed position, the first arm section 47a downwardly extends from the first coil section 45 in contact with the reverse surface of the first door panel 3.

The second arm section 47b tangentially extends from an end of the second coil section 46. To urge the second door panel 4 toward its closed position, the second arm section 47b upwardly extends from the second coil section 46 in contact with the reverse surface of the second door panel 4.

Figure 7:
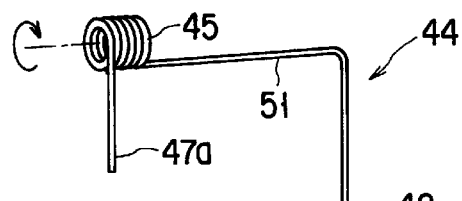
FIG. 7 is a perspective view showing the spring incorporated in the first embodiment.
Figure 8A:
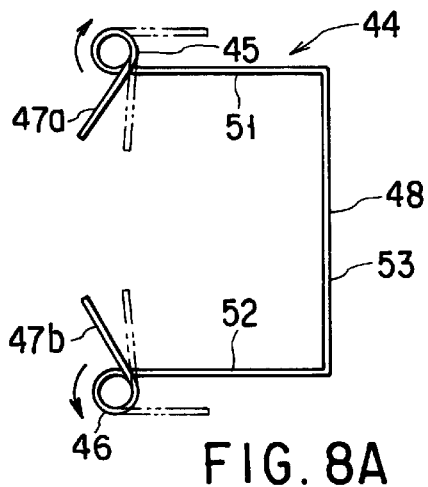
FIG. 8A is a side view of the spring incorporated in the first embodiment, illustrating a state in which first and second coil sections have windings wound in opposite directions.

Since the first and second arm sections 47a and 47b extend, in opposite directions, from the first and second coil sections 45 and 46, respectively, the winding direction of the first coil section 45 connected to the first arm section 47a is opposite to that of the second coil section 46 connected to the second arm section 47b, as is indicated by the arrows of FIG. 7 or 8A.

The first and second coil sections 45 and 46 including the first and second arm sections 47a and 47b can be formed symmetrical by winding the first and second coil sections 45 and 46 in opposite directions in accordance with the extending directions of the first and second arm sections 47a and 47b.

Figure 8B:
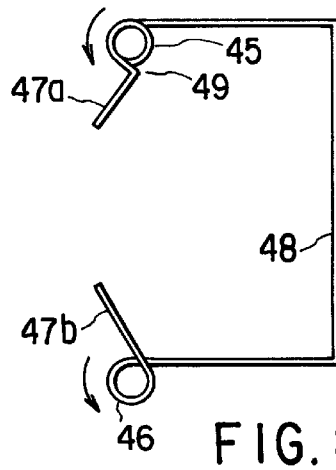
FIG. 8B is a side view of the spring incorporated in the first embodiment, illustrating a state in which the first and second coil sections have windings wound in the same direction.

On the other hand, if, for example, the winding direction of the first coil section 45 is the same as that of the second coil section 46, it is necessary to form, at a boundary between the first coil section 45 and the first arm section 47a, a special bending section 49 that reverses the extending direction of the first arm section 47a, as shown in FIG. 8B, in order to make the first arm section 47a extend to the reverse surface of the first door panel 3.

In this case, the first and second coil sections 45 and 46 including the first and second arm sections 47a and 47b cannot be formed symmetrical, and further an extra bending process is required for forming the bending section 49. This inevitably increases the manufacturing cost of the door mechanism, and requires strict control of dimensions of the first arm section 47a having the bending section 49. As a result, it is very disadvantageous to mass-produce the spring shown in FIG. 8B as compared with the spring 44 of FIG. 8A.

Figure 5:
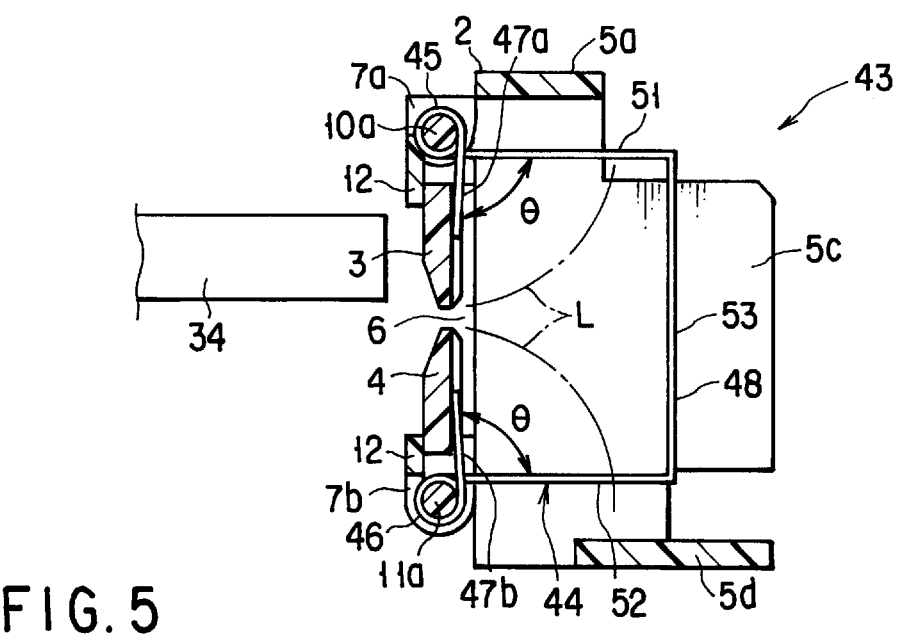
FIG. 5 is a sectional view of the door mechanism according to the first embodiment, in which the spring and the first and second door panels are attached to the frame.
Figure 6:
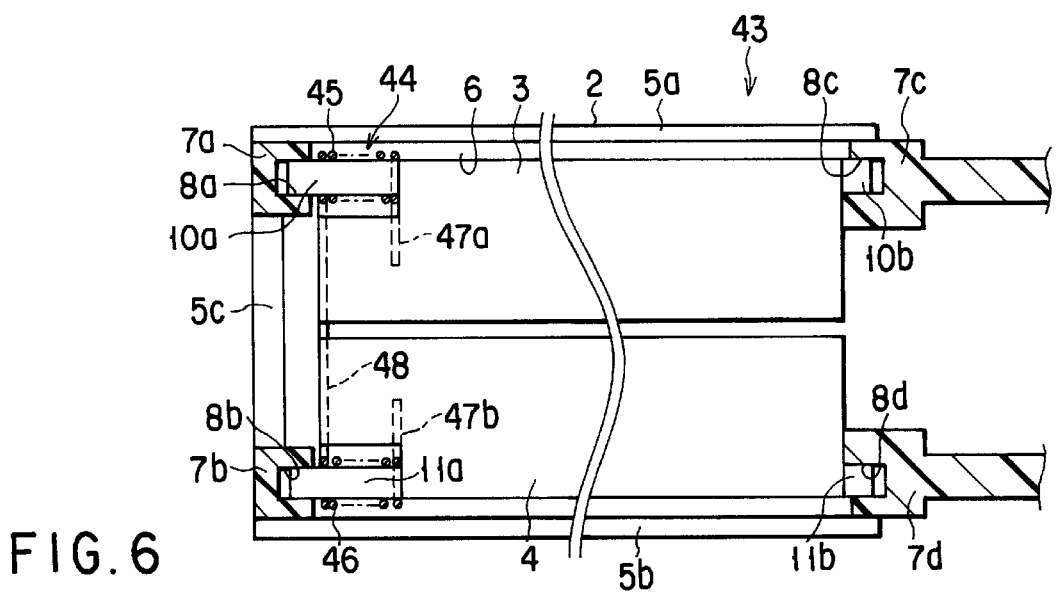
FIG. 6 is another sectional view of the door mechanism according to the first embodiment, in which the spring and the first and second door panels are attached to the frame.

As shown in FIG. 5 or 7, the connecting section 48 of the spring 44 is connected to the other ends of the first and second coil sections 45 and 46. The connecting section 48 comprises a first horizontal arm section 51 horizontally extending from the other end of the first coil section 45, a second horizontal arm section 52 horizontally extending from the other end of the second coil section 46, and a vertical arm section 53 extending between the horizontal arm sections 51 and 52.

The first horizontal arm section 51 horizontally extends from a location near an end of the first pivot shaft 10a of the first door panel 3, toward the interior of the insertion port 6. The horizontal arm section 51 is longer than the radius of the swing track L of the first door panel 3.

Similarly, the second horizontal arm section 52 horizontally extends from a location near an end of the first pivot shaft 11a of the second door panel 4, to the interior of the insertion port 6. The second horizontal arm section 52 is longer than the radius of the swing track L of the second door panel 4. Accordingly, the angle-of-twist θ determined by the first arm section 47a and the first horizontal arm section 51, or determined by the second arm section 47b and the second horizontal arm section 52, is set at about 100° or more in a free state in which no load is applied to the spring 44.

As a result, when the first and second arm sections 47a and 47b are in contact with the first and second door panels 3 and 4, respectively, they are urged in a direction in which the coil sections 45 and 46 are loosened. In this state, the angle-of-twist θ determined by the arm sections 47a and 47b is reduced.

Accordingly, the coil sections 45 and 46 generate repulsive forces to return the first and second arm sections 47a and 47b to their original positions, thereby swinging the first and second door panels 3 and 4 until they are brought into contact with the stoppers 12. As a result, the first and second door panels 3 and 4 are kept in their closed positions.

When the first and second door panels 3 and 4 have been swung from their closed positions to their open positions, the first and second arm sections 47a and 47b are urged more than before in a direction in which the first and second coil sections 45 and 46 are loosened. Accordingly, the angle-of-twist θ becomes a value close to 0, thereby increasing the repulsive forces of the coil sections 45 and 46. These increased repulsive forces serve as restoring forces for restoring the door panels 3 and 4 from the open positions to the closed positions.

The vertical arm section 53 and horizontal arm sections 51 and 52 of the connecting section 48 are joined to connect the first and second coil sections 45 and 46 to each other. All of these sections are actually formed integral as one body. The vertical arm section 53 and horizontal arm sections 51 and 52 are situated adjacent to the inner surface of the one side wall 5c of the frame 2.

In the door mechanism 43 constructed as above, the first and second door panels 3 and 4 and the spring 44 are attached to the frame 2 in the following manner.

First, the first coil section 45 of the spring 44 is mounted on the first pivot shaft 10a of the first door panel 3. Subsequently, while taking care not to make the first coil section 45 come off the pivot shaft 10a, the first pivot shaft 10a is inserted into the bearing hole 8a of the first bearing 7a. The insertion of the first pivot shaft 10a is executed with the first door panel 3 protruding in front of the corresponding stopper 12 of the frame 2, so that the frame 2 and the stoppers 12 will not interrupt the inserting operation.

When mounting the first coil section 45 on the first pivot shaft 10a, the rotation of the first coil section 45 on the shaft 10a is limited since it is connected to the second coil section 46 by means of the connecting section 48. Accordingly, the positional relationship between the first arm section 47a and the first door panel 3 is determined appropriately simply by mounting the first coil section 45 on the first pivot shaft 10a. Therefore, it is not necessary to hold the first coil section 45 with the fingertips.

After that, the first door panel 3 is pushed toward the side wall 5c, and forcibly bent. By bending the panel 3, the distance between the first and second pivot shafts 10a and 10b is temporarily narrowed to thereby fit the second pivot shaft 10b in the bearing hole 8c of the third bearing 7c. As a result, the first door panel 3 is swingably attached to the frame 2 by means of the first and second pivot shafts 10a and 10b.

Lastly, the first door panel 3 is pushed into the insertion port 6, and then forcibly swung so as to pass the stopper 12. As a result of the swinging operation, the first arm section 47a of the spring 44 is caught on the reverse surface of the first door panel 3. Thus, the attachment of the first door panel 3 to the frame 2 is completed.

The second coil section 46 of the spring 44 is connected to the first coil section 45 by means of the connecting section 48. Accordingly, the positional relationship between the first and second coil sections 45 and 46 is maintained. Therefore, when the first door panel 3 has been attached to the frame 2, the second coil section 46 is situated near the second bearing 7b on the side wall 5c.

This being so, after the attachment of the first door panel 3 is completed, the first pivot shaft 11a of the second door panel 4 is fitted in the second coil section 46 of the spring 44, and inserted into the bearing hole 8b of the second bearing 7b with the second coil section 46 mounted thereon. The insertion of the first pivot shaft 11a is executed with the second door panel 4 protruding in front of the corresponding stopper 12 of the frame 2, so that the frame 2 and the stopper 12 will not interrupt the inserting operation.

After that, the connecting section 48 of the spring 44 is pressed against the side wall 5a with the fingertips, and the second door panel 4 is pushed toward the side wall 5c and forcibly bent, while taking care not to move the connecting section 48. As a result, the distance between the first and second pivot shafts 11a and 11b is temporarily narrowed to thereby fit the second pivot shaft 11b into the bearing hole 8d of the fourth bearing 7d. Thus, the second door panel 4 is swingably attached to the frame 2 by means of the first and second pivot shafts 11a and 11b.

Lastly, the second door panel 4 is pushed into the insertion port 6, and then forcibly swung so as to pass the stopper 12. By the swinging operation, the second arm section 47b of the spring 44 is caught on the reverse surface of the second door panel 4. This is the termination of the attachment of the second door panel 4 to the frame 2.

In the above-described first embodiment of the invention, the first and second coil sections 45 and 46 of the spring 44 are connected to each other by means of the connecting section 48, and the connecting section 48 protrudes along the side wall 5c of the frame 2 inside the insertion port 6. Therefore, when inserting, into the bearing holes 8a and 8b, the first pivot shaft 10a with the first coil section 45 mounted thereon, and the second pivot shaft 11a with the second coil section 46 mounted thereon, the connecting section 48 connecting the first and second coil sections 45 and 46 can be pressed against the side wall 5c with the fingertips, thereby facilitating the positioning of the spring 44 with respect to the frame 2.

Moreover, since the connecting section 48 limits the rotation of the first and second coil sections 45 and 46, the positions of the first and second arm sections 47a and 47b with respect to the first and second door panels 3 and 4 can be appropriately determined upon mounting the coil sections 45 and 46 on the first pivot shafts 10a and 11b.

This being so, it is not necessary to execute the complicated operation of inserting the first pivot shafts 10a and 11a while taking care not to rotate the spring 44. This makes the handling of the spring 44 easier than in the conventional case. This structure can not only prevent deformation or loss of the spring 44, but also significantly improve the efficiency of the attachment, to the frame 2, of the spring 44 and the first and second door panels 3 and 4.

Moreover, the spring 44 serves as a common element that connects the first and second door panels 3 and 4 to each other. Therefore, the number of structural elements required for the door mechanism is smaller than in the conventional case where the first and second door panels 3 and 4 require their respective helical torsion springs 13. This facilitates mass production of the door mechanism, together with the aforementioned improved efficiency, and hence enables reduction of the manufacturing cost.

Figure 9:
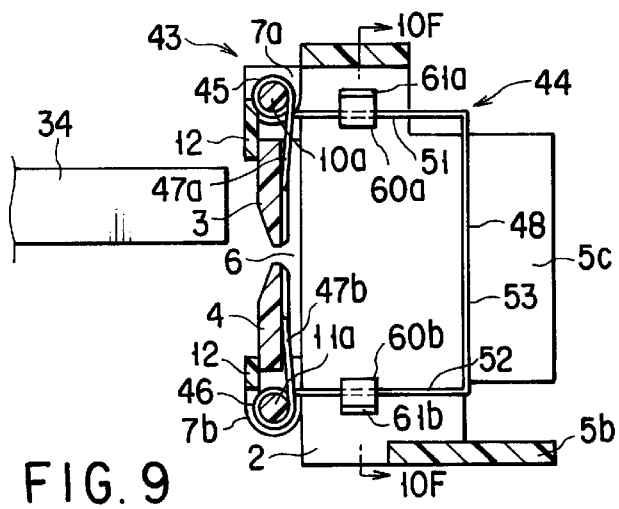
FIG. 9 is a sectional view of a door mechanism according to a second embodiment, illustrating a state in which a spring and first and second door panels are attached to a frame.
Figure 10:
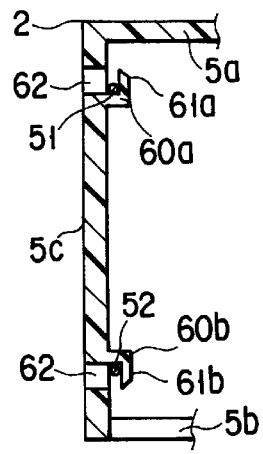
FIG. 10 is a sectional view taken along line 10F—10F of FIG. 9.

The present invention is not limited to the above-described first embodiment. Referring then to FIGS. 9 and 10, a second embodiment of the invention will be described.

The second embodiment is different from the first embodiment in that the former additionally employs a structure for holding the spring 44 on the frame 2 to facilitate attachment of the door panels 3 and 4 to the frame 2. Concerning the other structural elements of the door mechanism 43, the first and second embodiments are similar to each other. Therefore, in the second embodiment, similar elements to those of the first embodiment are denoted by corresponding reference numerals, and no detailed description will be given thereof.

As shown in FIG. 9, the connecting section 48 of the spring 44 extends along the inner surface of the side wall 5c of the frame 2. A pair of engagement claws 60a and 60b are provided on the inner surface of the side wall 5c just behind the first and second bearings 7a and 7b, respectively, vertically separated from each other. The engagement claws 60a and 60b project from the inner surface of the side wall 5c toward the insertion port 6, and have holding portions 61a and 61b bent at right angles, respectively.

The holding portions 61a and 61b are disposed to hold the first and second horizontal arm sections 51 and 52 of the spring 44 between themselves and the inner surface of the side wall 5c, to thereby clamp the spring 44 to the side wall 5c. In the clamped state, the first and second coil sections 45 and 46 of the spring 44 are positioned coaxial with the bearing holes 8a and 8b, respectively.

The engagement claws 60a and 60b can be formed easily using a separation-type injection mold. Through holes 62 for die cutting are formed in the side wall 5c.

A description will be given of the procedure of attaching the first and second door panels 3 and 4 to the frame 2, employed in the second embodiment.

First, the spring 44 is inserted into the insertion port 6, and the connecting section 48 of the spring 44 is made to be close and parallel to the inner surface of the side wall 5c. Subsequently, the first and second horizontal arm sections 51 and 52 of the spring 44 are held between the side wall 5c and the holding portions 61a and 61b, respectively, thereby securing the spring 44 to the side wall 5c so that the first and second coil sections 45 and 46 are aligned with the bearing holes 8a and 8b, respectively.

After that, the first pivot shaft 10a of the first door panel 3 is inserted into the first coil section 45, and also into the bearing hole 8a of the first bearing 7a. Then, the first door panel 3 is pushed toward the side wall 5c, and the second pivot shaft 10b of the panel 3 is inserted into the bearing hole 8c of the third bearing 7c while forcibly warping the door panel 3. As a result, the first door panel 3 is swingably attached to the frame 2, with the first and second pivot shafts 10a and 10b inserted in the bearing holes 8a and 8c.

Lastly, the first door panel 3 is forcibly swung and pushed into the insertion port 6 so as to pass the stopper 12. In this state, the first arm section 47a of the spring 44 is caught on the reverse surface of the first door panel 3, which is the termination of the attachment of the first door panel 3 to the frame 2.

After the completion of the attachment of the first door panel 3 to the frame 2, the first pivot shaft 11a of the second door panel 4 is inserted into the second coil section 46 of the spring 44, thereby repeating the same procedure as above to attach the second door panel 4 to the frame 2. Thus, the first and second door panels 3 and 4 can be swingably attached to the frame 2 by repeating the same operation twice.

As described above, in the second embodiment, the spring 44 is clamped on the side wall 5c of the frame 2 so that the first and second coil sections 45 and 46 of the spring 44 are positioned coaxial with the bearing holes 8a and 8b, before inserting the first pivot shafts 10a and 11a of the first and second door panels 3 and 4 into the bearing holes 8a and 8b.

Accordingly, the positioning of the spring 44 and the insertion of the first pivot shafts 10a and 11a can be executed individually, and it is sufficient if the first pivot shafts 10a and 11a are inserted into the bearing holes 8a and 8b, simply with the positioned first and second coil sections 45 and 46 mounted thereon. As a result, it is not necessary to execute the complicated and troublesome operation of inserting the first pivot shafts 10a and 11a while taking care not to rotate the spring 44. This means that the spring can be handled more easily than in the conventional case.

This structure can prevent deformation or loss of the spring 44 and significantly improve the efficiency of the attachment, to the frame 2, of the spring 44 and the first and second door panels 3 and 4.

FIGS. 11–14 illustrate a third embodiment of the invention.

The third embodiment is different from the second embodiment in the structure for holding the spring 44 on the side wall 5c of the frame 2 to facilitate attachment of the door panels 3 and 4 to the frame 2. The third and second embodiments are similar to each other in the basic structure of the door mechanism 43 other than the holding structure.

Figure 12:
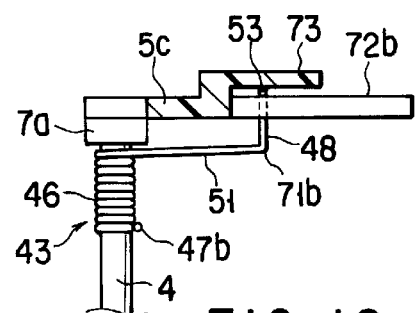
FIG. 12 is a sectional view taken along line 12F—12F of FIG. 11.
Figure 14:
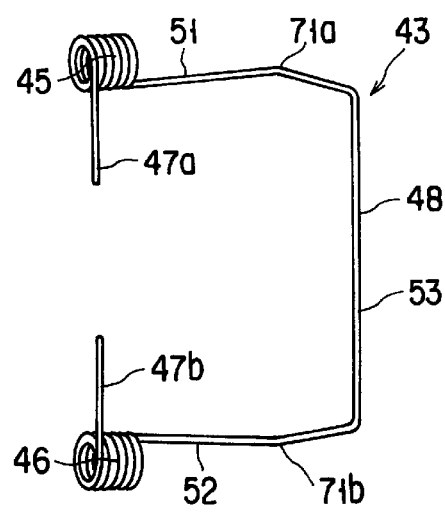
FIG. 14 is a perspective view showing a spring incorporated in the third embodiment.

As shown in FIG. 12 or 14, the connecting section 48 of the spring 44 has a bent portion 71a between the first horizontal arm section 51 and the vertical arm section 53, and also a bent portion 71b between the vertical arm section 53 and the second horizontal arm section 52. The bent portions 71a and 71b are bent at right angles with respect to the axes of the first and second coil sections 45 and 46, respectively. Accordingly, the vertical arm section 53 of the connecting section 48 extends outside the side wall 5c of the frame 2 along the rear edge of the side wall 5c.

Figure 11:
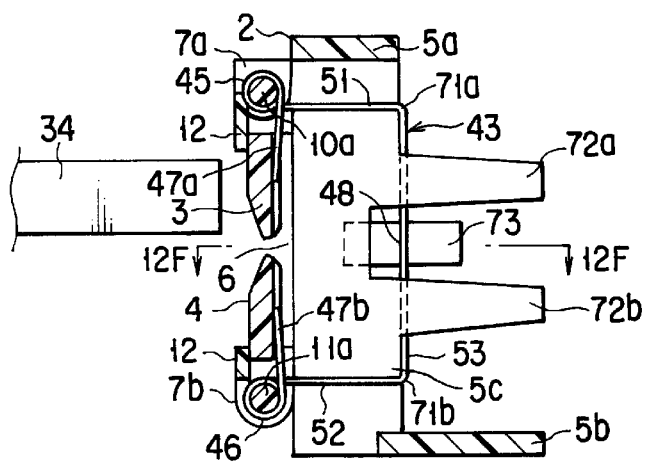
FIG. 11 is a sectional view of a door mechanism according to a third embodiment, illustrating a state in which a spring and first and second door panels are attached to a frame.
Figure 13:
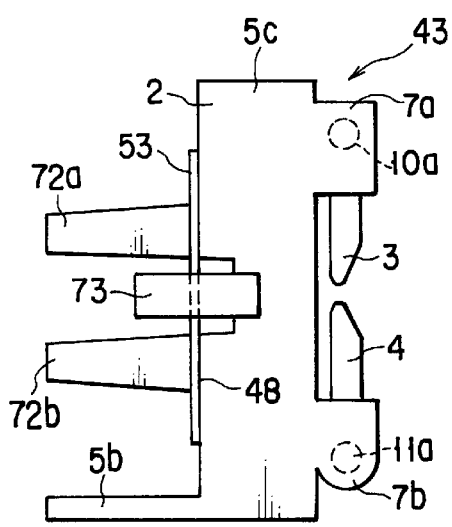
FIG. 13 is a side view of the door mechanism according to the third embodiment.

As is shown in FIG. 11 or 13, the side wall 5c of the frame 2 has a pair of engagement walls 72a and 72b. The engagement walls 72a and 72b are vertically separated from each other at the rear edge of the side wall 5c. Further, the engagement walls 72a and 72b project rearward, and the vertical arm section 53 of the connecting section 48 is in contact with the outer surfaces of the engagement walls 72a and 72b.

Further, a hook section 73 is formed on the outer surface of the side wall 5c, projecting rearward between the engagement walls 72a and 72b. The vertical arm section 53 of the connecting section 48 is in contact with the inner surface of the hook section 73.

In other words, the vertical arm section 53 is held between the engagement walls 72a and 72b and the hook section 73. In this state, the spring 44 is held on the side wall 5c such that the first and second coil sections 45 and 46 of the spring 44 are positioned coaxial with the bearing holes 8a and 8b of the side wall 5c. Thus, in the third embodiment, the engagement walls 72a and 72b and the hook section 73 serve as holding sections for holding the spring 44 between themselves and the side wall 5c.

Also in this structure, the spring 44 can be held on the side wall 5c of the frame 2 before inserting the first pivot shafts 10a and 11a of the first and second door panels 3 and 4 into the bearing holes 8a and 8b.

Accordingly, the positioning of the spring 44 and the insertion of the first pivot shafts 10a and 11a can be executed individually. Therefore, the third embodiment can dispense with the complicated and troublesome operation of inserting the first pivot shafts 10a and 11a while holding the spring 44, and hence can significantly improve the efficiency of attachment, to the frame 2, of the spring 44 and the first and second door panels 3 and 4.

Also, since, in the third embodiment, the bent portions 72a and 72b are provided between the first horizontal arm section 51 and the vertical arm section 53, and between the vertical arm section 53 and the second horizontal arm section 52, the vertical arm section 53 is made to protrude outside the side wall 5c, i.e. outside the insertion port 6. Therefore, when a PC card 34 has been inserted into the insertion port 6, it is not possible that the card 34 and the vertical arm section 53 will interfere with each other, or the vertical arm section 53 will interrupt the insertion of the card 34.

FIGS. 15 and 16 illustrate a fourth embodiment of the invention.

The fourth embodiment is mainly different from the first embodiment in the structure of the frame of the door mechanism, and is similar thereto in the other structural elements.

As shown in FIG. 15, a frame 81 employed in the fourth embodiment has upper and lower walls 82a and 82b and left and right side walls 82c and 82d. The upper and lower walls 82a and 82b extend horizontal and parallel to each other. The side walls 82c and 82d extend vertical, connecting the opposed ends of the upper and lower walls 82a and 82b. As is shown in FIG. 16, the side walls 82c and 82d are inclined such that they are away from each other as the depth of the insertion port 6 from the first door panel 3 increases.

A pair of bearings 84a and 84b are provided at edge portions of the side wall 82c close to the insertion port 6, while a pair of bearings 85a and 85b are provided at edge portions of the side wall 82d close to the insertion port 6. The bearings 84a and 85a are opposed to each other at the upper edge of the insertion port 6. The bearings 84b and 85b are opposed to each other at the lower edge of the insertion port 6. The bearings 84a, 84b, 85a and 85b each have a bearing hole 86 formed therein. The first and second pivot shafts 10a and 10b of the first door panel 3 and the first and second pivot shafts 11a and 11b of the second door panel 4 are each inserted in a corresponding bearing hole 86 of the bearings 84a, 84b, 85a and 85b such that they can rotate about their respective axes.

As shown in FIG. 15, the spring 44 bridges the second pivot shafts 10b and 11b of the first and second door panels 3 and 4. Therefore, the spring 44 is situated adjacent to the right-hand side wall 82d. The first and second horizontal arm sections 51 and 52 of the spring 44 extend along the axes of the first and second coil sections 45 and 46. The first and second horizontal arm sections 51 and 52 and the vertical arm section 53 are located along the inner surface of the inclined right-hand side wall 82d, and hence the connecting section 48 is laterally away from the insertion port 6.

An engagement claw 88 is formed on a vertically intermediate portion of the inner surface of the side wall 82d. The engagement claw 88 projects from the inner surface, and has a holding section 89 provided at its front end bent at right angles. The holding section 89 clamps the vertical arm section 53 of the connecting section 48 between itself and the inner surface of the side wall 82d, thereby holding the spring 44 on the side wall 82d. In this state, the first and second coil sections 45 and 46 of the spring 44 are positioned coaxial with the bearing holes 86 of the bearings 85a and 85b.

A s topper 93 is provided at an edge of the side wall 82 close to the insertion port 6, projecting to the insertion port 6 between the bearings 85a and 85b. Accordingly, when the first and second door panels 3 and 4 have been swung to their closed positions, the stopper 93 is brought into contact with the panels 3 and 4, thereby limiting their excessive swinging.

Also in this structure, the spring 44 can be easily held on the side wall 82d of the frame 81. Therefore, the positioning of the spring 44 and the insertion of the second pivot shafts 10b and 11b can be executed individually, and hence the efficiency of the attachment of the spring 44 and the first and second door panels 3 and 4 to the frame 81 is significantly improved.

Further, since, in this structure, the side walls 82c and 82d of the frame 81 are inclined such that they are away from each other as the depth of the insertion port 6 from the door panel 3 increases, the connecting section 48 of the spring 44 can be located laterally away from the insertion port 6, i.e. be prevented from projecting into the insertion port 6. This structure and the inclined side walls 82c and 82d are joined to minimize the extension of the door mechanism 43 in the housing 24, which is advantageous in securing a sufficient mounting space in the housing 24.

Figure 19:
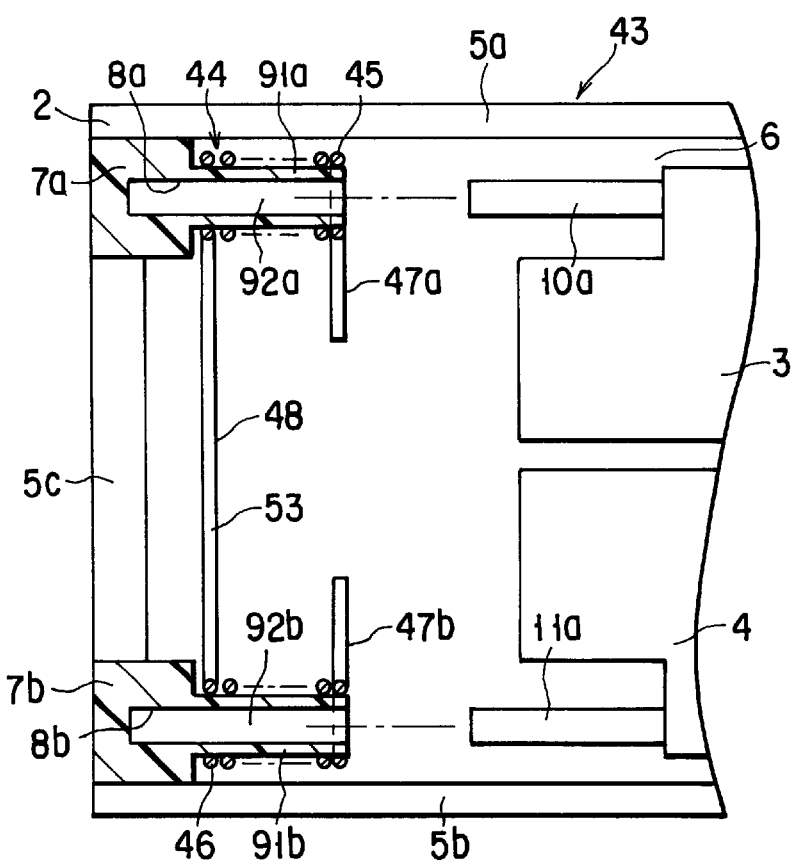
FIG. 19 is a sectional view of the door mechanism according to the fifth embodiment, illustrating a state in which a spring is incorporated in a boss section of a bearing.

FIGS. 17 to 19 illustrate a fifth embodiment of the invention.

The fifth embodiment is different from the first embodiment in the structure of the first and second bearings 7a and 7b that swingably support the first and second door panels 3 and 4, and is similar thereto in the basic structure of the door mechanism 43 other than the bearings.

As shown in FIG. 17, the first and second bearings 7a and 7b have bosses 91a and 91b formed integral therewith as one body, respectively. The bosses 91a and 91b horizontally project from the first and second bearings 7a and 7b toward the insertion port 6, respectively. The bosses 91a and 91b are cylindrical hollow members having insertion holes 92a and 92b formed therein, respectively. The insertion holes 92a and 92b are coaxial with and communicate with the bearing holes 8a and 8b of the first and second bearings 7a and 7b.

The first pivot shafts 10a and 11a of the first and second door panels 3 and 4 are rotatably fitted in the bearing holes 8a and 8b via the insertion holes 92a and 92b, respectively. The first pivot shafts 10a and 11a are covered with the bosses 91a and 91b, on which the first and second coil sections 45 and 46 of the spring 44 are mounted. Accordingly, the spring 44 is held on the side wall 5c of the frame 2, with the first and second coil sections 45 and 46 arranged coaxial with the insertion holes 92a and 92b.

A description will be given of the procedure of attaching the first and second door panels 3 and 4 to the frame 2 in the above structure. First, the spring 44 is inserted into the insertion port 6, and the first and second coil sections 45 and 46 of the spring 44 are mounted on the bosses 91a and 91b, respectively, as shown in FIG. 19. As a result, the spring 44 is held on the side wall 5c.

Subsequently, the first pivot shaft 10a of the first door panel 3 is inserted into the bearing hole 8a of the first bearing 7a through the insertion hole 92a of the boss 91a. In this state, the first door panel 3 is pressed toward the side wall 5c, and the second pivot shaft 10b of the panel 3 is inserted into the bearing hole 8c of the third bearing 7c while forcibly bending the panel 3.

Lastly, the first door panel 3 is swung and pushed into the insertion port 6 so as to pass the stopper 12. In this state, the reverse surface of the first door panel 3 is caught by the first arm section 47a of the spring 44, which is the termination of the attachment of the first door panel 3 to the frame 2.

After the completion of the attachment of the first door panel 3 to the frame 2, the first pivot shaft 11a of the second door panel 4 is inserted into the insertion hole 92b of the boss 91b, thereby repeating the above-described procedure to attach the door panel 4 to the frame 2. Thus, the first and second door panels 3 and 4 can be swingably attached to the frame 2 by repeating the same operation twice.

Since, in the above structure, the cylindrical hollow bosses 91a and 91b are incorporated in the first and second bearings 7a and 7b provided at the side wall 5c, the first and second coil sections 45 and 46 of the spring 44 can be mounted thereon. Accordingly, the spring 44 can be held on the side wall 5c, with the coil sections 45 and 46 made coaxial with the insertion holes 92a and 92b. Further, since the first and second coil sections 45 and 46 are connected by the connecting section 48, rotation of the coil sections 45 and 46 on the bosses 91a and 91b is limited, which enables appropriate control of the directions of the first and second arm sections 47a and 47b.

As a result, the positioning of the spring 44 and the insertion of the first pivot shafts 10a and 11a can be executed individually, and hence it is sufficient if the first pivot shafts 10a and 11a are inserted into the insertion holes 92a and 92b of the bosses 91a and 91b.

Therefore, it is not necessary to execute the complicated and troublesome operation of inserting the first pivot shafts 10a and 11a while pressing the spring 44. This means that the spring 44 can be handled more easily than in the conventional case, whereby deformation or loss of the spring 44 can be prevented, and the efficiency of the attachment, to the frame 2, of the spring 44 and the first and second door panels 3 and 4 can be significantly improved.

Figure 20:
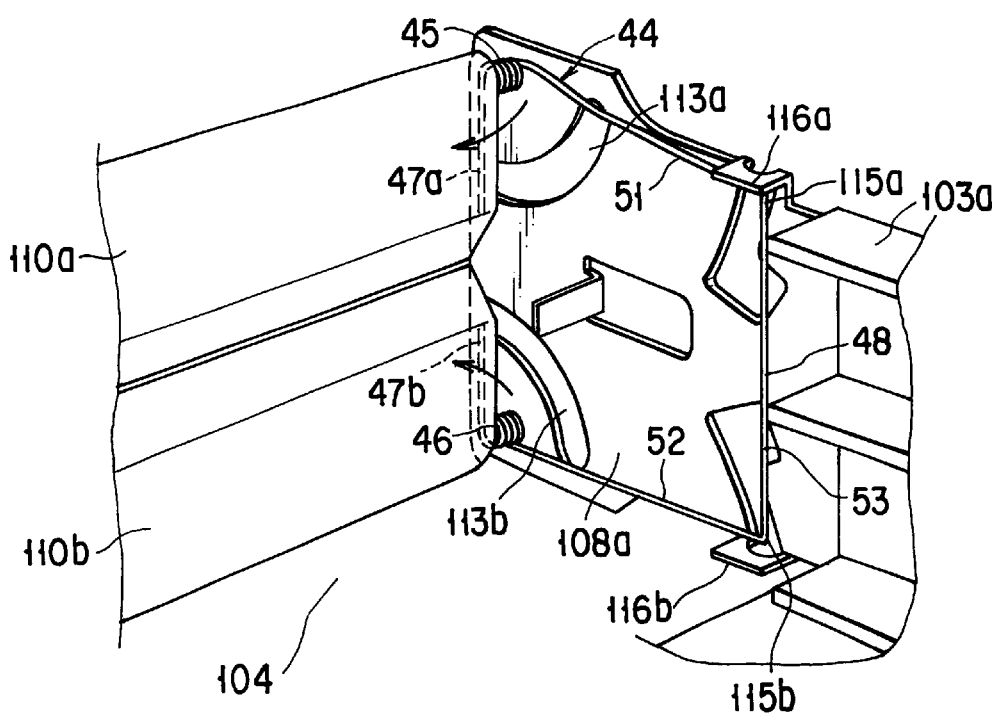
FIG. 20 is a perspective view of a card connecting device according to a sixth embodiment, illustrating a state in which a spring and first and second door panels are attached to a frame.
Figure 21:
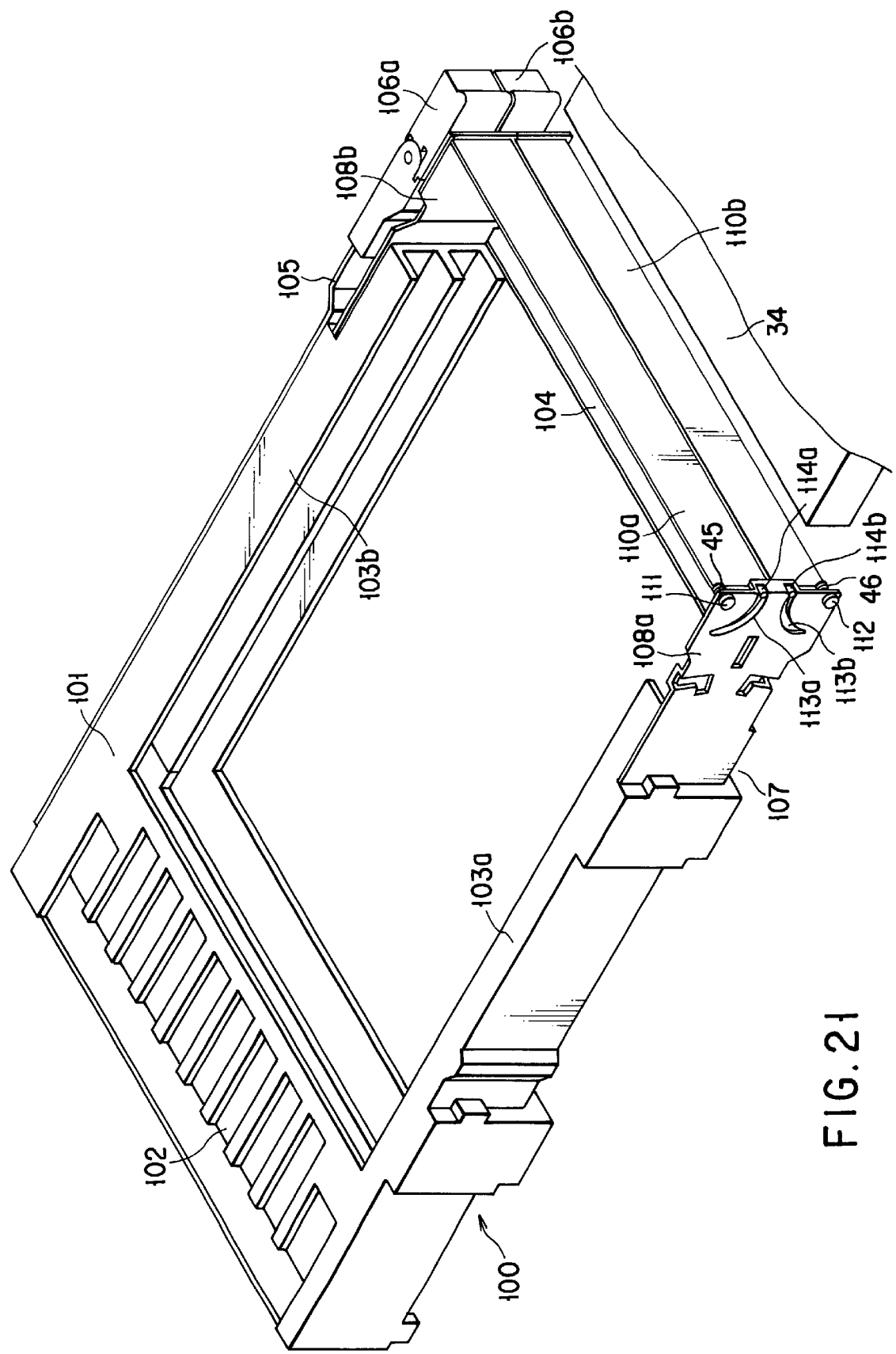
FIG. 21 is a perspective view illustrating the entire structure of the card connecting device according to the sixth embodiment.
Figure 22:
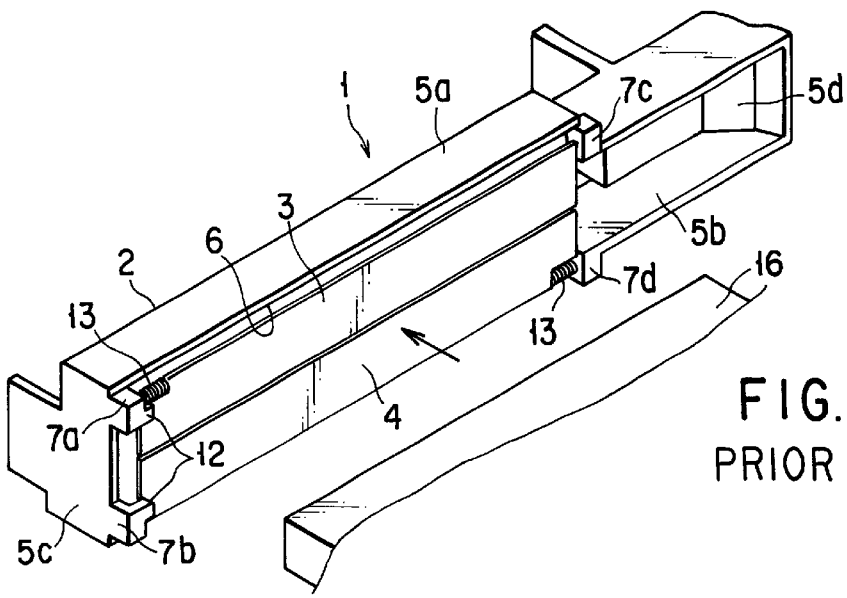
FIG. 22 is a perspective view showing a conventional door mechanism.
Figure 23:
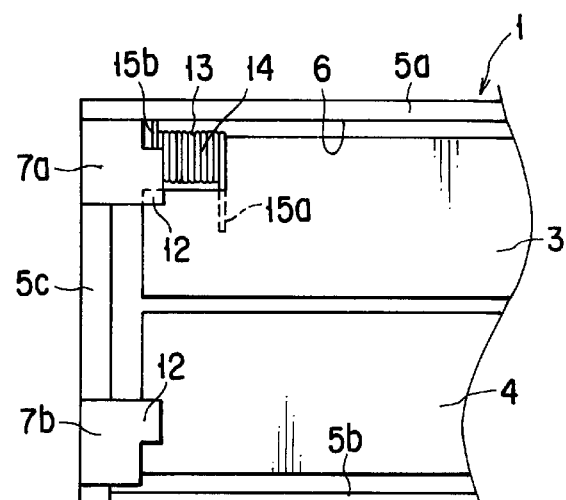
FIG. 23 is a front view of the conventional door mechanism, illustrating a state in which a spring and first and second door panels are attached to a frame.
Figure 24:
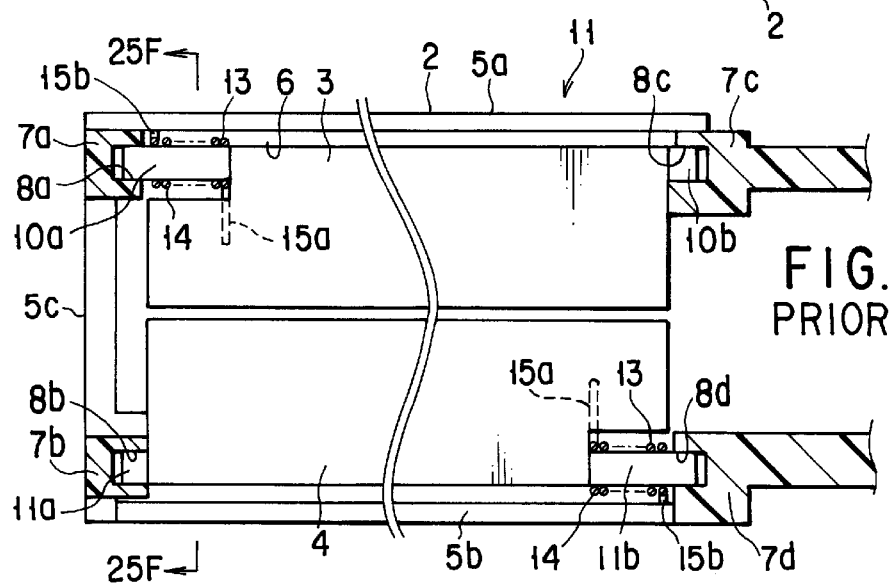
FIG. 24 is a sectional view of the conventional door mechanism, illustrating the state in which the springs and the first and second door panels are attached to the frame.
Figure 25:
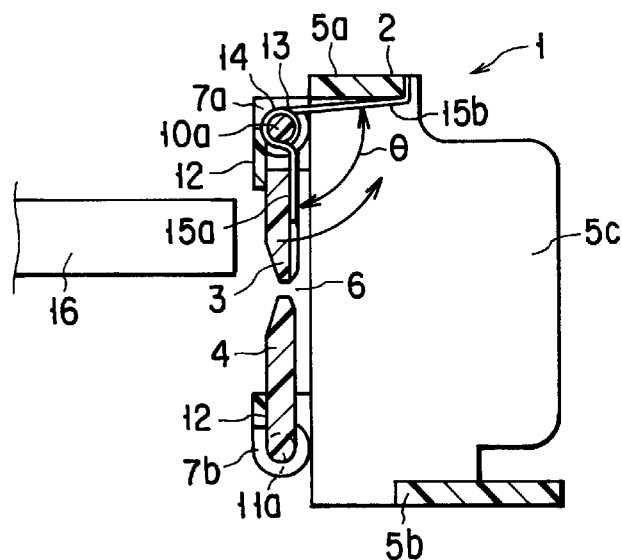
FIG. 25 is a sectional view taken along line 25F—25F of FIG. 24.
Figure 26:
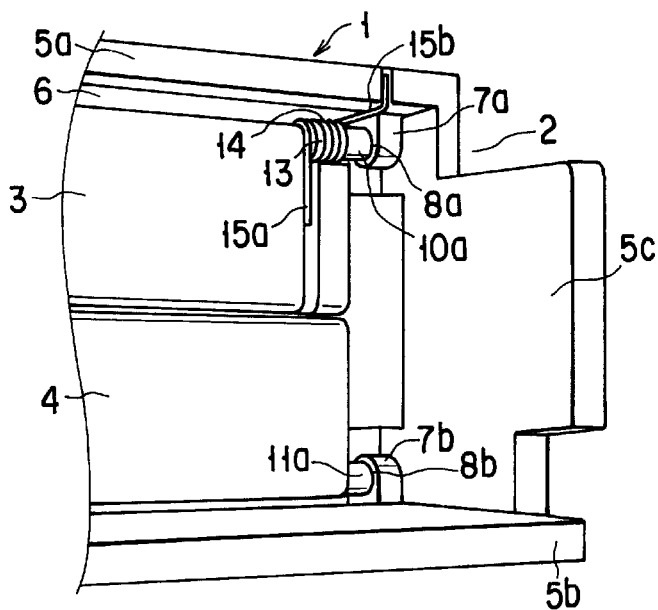
FIG. 26 is a perspective view of the conventional door mechanism, illustrating the state in which the spring and the first and second door panels are attached to the frame.
Figure 27:
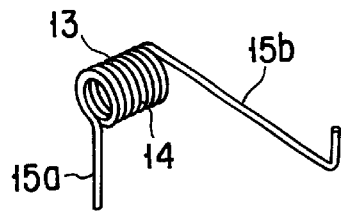
FIG. 27 is a perspective view of a conventional helical torsion spring.
Figure 28:
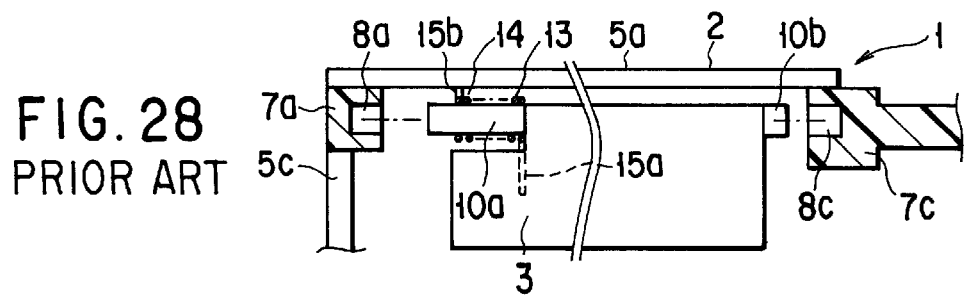
FIG. 28 is a sectional view of the conventional door mechanism, useful in explaining how the first door panel is incorporated in the frame.

FIGS. 20 and 21 show a sixth embodiment of the invention.

The sixth embodiment is directed to a card connecting device 100 to which the PC card 34 is disconnectably connected. As shown in FIG. 21, the card connecting device 100 comprises a synthetic resin case 101 for containing the PC card 34, and a card connector 102 provided at one side of the case 101. The case 101 has a pair of guide walls 103a and 103b arranged parallel to and opposed to each other for guiding the PC card 34 to the card connector 102. The case 101 also has an insertion port 104 through which the PC card 34 is inserted and ejected. The insertion port 104 is situated at the opposite side of the case with respect to the card connector 102, opposed thereto.

The case 101 has an ejector 105 for ejecting the PC card 34. The ejector 105 includes a pair of operation levers 106a and 106b to be operated manually. The operation levers 106a and 106b are supported by the guide wall 103b.

As shown in FIG. 21, a metal frame 107 is attached to the case 101. The frame 107 has a pair of support stays 108a and 108b extending along the guide walls 103a and 103b, respectively, at the opposite side of the case with respect to the card connector 102. The front ends of the support stays 108a and 108b project from the guide walls 103a and 103b, respectively, opposed to each other, and the insertion port 104 is situated between the support stays 108a and 108b.

The support stays 108a and 108b support first and second door panels 110a and 110b. The first and second door panels 110a and 110b are formed of slim plate-like members that extend along the insertion port 104 and is made of an elastically deformable synthetic resin. The door panels 110a and 110b are situated just in front of the insertion port 104 one on top of the other, connecting the support stays 108a and 108b.

The first door panel 110a situated in the upper stage has pivot shafts 111 (only one of which is shown) at the opposite ends of the upper edge thereof. Each pivot shaft 111 is rotatably supported by the support stays 108a and 108b. The second door panel 110b situated in the lower stage has pivot shafts 112 (only one of which is shown) at the opposite ends of the upper edge thereof. Each pivot shaft 112 is rotatably supported by the support stays 108a and 108b.

As shown in FIG. 20 or 21, the support stay 108a remote from the ejector 105 has guide grooves 113a and 113b. The guide grooves 113a and 113b are used to determine the ranges of swinging of the first and second door panels 110a and 110b, respectively. The guide grooves 113a and 113b are formed arcuate, and symmetrical with respect to a horizontal line such that they correspond to the first and second door panels 110a and 110b. The guide grooves 113a and 113b face respective end surfaces of the first and second door panels 110a and 110b. The end surfaces of the first and second door panels 110a and 110b have guide shafts 114a and 114b, respectively, arranged such that they can slide in the guide grooves 113a and 113b, respectively.

Thus, the first and second door panels 110a and 110b are supported by the support stays 108a and 108b, such that they can pivot about the pivot shafts 111 and 112, respectively, between their closed positions in which the insertion port 104 is closed, and their open positions in which the insertion port 104 is open.

When the first and second door panels 110a and 110b are in their closed positions, they stand in the same vertical plane and close the insertion port 104. On the other hand, when the first and second door panels 110a and 110b are swung to their open positions, they are swung apart in opposite directions along the guide grooves 113a and 113b, and situated horizontal, whereby they are retreated from the insertion port 104.

In the state shown in FIG. 20, the first and second door panels 110a and 110b are urged by the spring 44 in the closed positions. The spring 44 connects one of the pivot shafts 111 of the first door panel 110a to one of the pivot shafts 112 of the second door panel 110b. Thus, the location of the spring 44 is at one side of the door panels 110a and 110b.

The first coil section 45 of the spring 44 is mounted on the one of the pivot shafts 111 of the first door panel 110a. The first arm section 47a of the coil section 45, which is tangentially led from one end of the coil section 45, extends downward therefrom and is caught by the guide shaft 114a of the first door panel 110a. Accordingly, the first arm section 47a urges the first door panel 110a toward its closed position as indicated by the arrow in FIG. 20.

The second coil section 46 of the spring 44 is mounted on the one of the pivot shafts 112 of the second door panel 110b. The second arm section 47b of the coil section 46, which is tangentially led from one end of the coil section 46, extends upward therefrom and is caught by the guide shaft 114b of the second door panel 110b. Accordingly, the second arm section 47b urges the second door panel 110b toward its closed position as indicated by the arrow in FIG. 20.

The connecting section 48 of the spring 44 extends along the inner surface of the support stay 108a toward the insertion port 104. The vertical arm section 53 of the connecting section 48 extends just behind the insertion port 104. A corner section 115a defined by the upper end of the vertical arm section 53 and the first horizontal arm section 51 is situated adjacent to the upper edge of the support stay 108a. A corner section 115b defined by the lower end of the vertical arm section 53 and the second horizontal arm section 52 is situated adjacent to the lower edge of the support stay 108a. The support stay 108a has flange-shaped holding sections 116a and 116b bent at right angles at its upper and lower edges. The holding sections 116a and 116b are opposed to each other with the vertical arm section 53 interposed therebetween. The corner sections 115a and 115b of the connecting section 48 are held by the holding sections 116a and 116b, respectively. Thus, the spring 44 is held by the support stay 108a of the frame 107.

In the card connecting device 100 constructed as above, the first and second coil sections 45 and 46 of the spring 44 are connected to each other by the connecting section 48, and the corner sections 115a and 115b of the connecting section 48 are held by the support stay 108a. Accordingly, the spring 44 can be easily positioned on the frame 107 before rotatably connecting the pivot shafts 111 and 112 of the first and second door panels 110a and 110b to the support stay 108a.

Further, since the first and second coil sections 45 and 46 are connected by the connecting section 48, their rotation is limited. Therefore, immediately after the coil sections 45 and 46 are fitted on the pivot shafts 111 and 112, the arm sections 47a and 47b are correctly positioned with respect to the first and second door panels 110a and 110b.

Accordingly, it is not necessary to execute the complicated and troublesome operation of inserting the pivot shafts 111 and 112 while taking care not to rotate the spring 44, which means that the spring can be handled easily. This structure can prevent deformation or loss of the spring 44 and significantly improve the efficiency of the attachment, to the support stay 108a, of the spring 44 and the first and second door panels 110a and 110b.

The door mechanism according to the invention is applicable not only to the above-described card slot for inserting PC cards, but also to the opening of a CD-ROM driving unit or a floppy-disk driving unit, or to an opening for exposing a connector.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A door mechanism comprising:
a frame having an insertion port;
first and second door panels each having a pivot shaft connected to the frame such that the pivot shaft can rotate about an axis thereof, the first and second door panels being supported by the frame such that they can swing about the respective pivot shafts between closed positions in which the first and second door panels are situated in a single plane and close the insertion port, and open positions in which the first and second door panels open the insertion port, the first and second door panels being swung apart in opposite directions when they are shifted from the respective closed positions to the respective open positions; and
a spring urging the first and second door panels toward the respective closed positions, the spring having a first coil section mounted on the pivot shaft of the first door panel, a second coil section mounted on the pivot shaft of the second door panel, arm sections each extending from one end of a corresponding one of the first and second coil sections and urging the first and second door panels toward the respective closed positions, and a connecting section bridging another end of each of the first and second coil sections.

2. The door mechanism according to claim 1, wherein the spring is formed by bending a single metal strand.

3. The door mechanism according to claim 1, wherein the first and second coil sections of the spring have windings wound in opposite directions.

4. The door mechanism according to claim 1, wherein the connecting section of the spring is situated in a position in which the first and second door panels do not pass when they swing.

5. The door mechanism according to claim 1, wherein the connecting section of the spring extends along the frame.

6. The door mechanism according to claim 1, wherein the frame has a side wall opposed to the connecting section of the spring, the side wall having a pair of bearing holes in which the pivot shafts of the first and second door panels are fitted such that the pivot shafts can rotate about respective axes thereof.

7. The door mechanism according to claim 6, wherein the side wall of the frame has a holding section that holds the connecting section of the spring.

8. The door mechanism according to claim 7, wherein the first and second coil sections are positions coaxial with the bearing holes when the connecting section is held by the holding section.

9. The door mechanism according to claim 1, further comprising an insertion article to be ejectably inserted into the insertion port, the insertion article being made to collide with the first and second door panels situated in the respective closed positions when it is inserted into the insertion port, thereby swinging the first and second door panels to the respective open positions, the first and second door panels being kept in the respective closed positions when the insertion article is not inserted in the insertion port.

10. A door mechanism comprising:
a frame having an insertion port and a plurality of bearings provided at edge portions of the insertion port;
first and second door panels having respective pivot shafts supported by the bearings of the frame such that the pivot shafts can rotate about axes thereof, the first and second door panels being supported by the frame such that they can swing about the respective pivot shafts between closed positions in which the first and second door panels are situated in a single plane and close the insertion port, and open positions in which the first and second door panels open the insertion port, the first and second door panels being swung apart in opposite directions when they are shifted from the respective closed positions to the respective open positions; and
a spring urging the first and second door panels toward the respective closed positions,
wherein the bearings of the frame have respective cylindrical hollow bosses in which the pivot shafts are inserted such that they can rotate about axes thereof; and
the spring includes first and second coil sections mounted on a circumference of the bosses, arm sections each extending from one end of a corresponding one of the first and second coil sections and urging the first and second door panels toward the respective closed positions, and a connecting section bridging another end of each of the first and second coil sections.

11. The door mechanism according to claim 10, further comprising an insertion article to be ejectably inserted into the insertion port, the insertion article being made to collide with the first and second door panels situated in the respective closed positions when it is inserted into the insertion port, thereby swinging the first and second door panels to the respective open positions, the first and second door panels being kept in the respective closed positions when the insertion article is not inserted in the insertion port.

12. The door mechanism according to claim 10, wherein the first and second coil sections of the spring have windings wound in opposite directions.

13. A door mechanism for opening and closing a card slot into which a PC card is ejectably inserted, comprising:

a frame having the card slot;

first and second door panels each having a pivot shaft connected to the frame such that the pivot shaft can rotate about an axis thereof, the first and second door panels being supported by the frame such that they can swing about the respective pivot shafts between closed positions in which the first and second door panels are situated in a single plane and close the insertion port, and open positions in which the first and second door panels open the insertion port, the first and second door panels being situated in the respective closed positions when the PC card is not inserted in the card slot, the first and second door panels being swung apart in opposite directions when the PC card is inserted into the card slot to thereby shift the first and second door panels from the respective closed positions to the respective open positions; and a spring urging the first and second door panels toward the respective closed positions, the spring having a first coil section mounted on the pivot shaft of the first door panel, a second coil section mounted on the pivot shaft of the second door panel, arm sections each extending from one end of a corresponding one of the first and second coil sections and urging the first and second door panels toward the respective closed positions, and a connecting section bridging another end of each of the first and second coil sections.

14. A door mechanism for opening and closing a card slot into which a PC card is ejectably inserted, comprising:

a frame having the card slot and a plurality of bearings provided at edge portions of the card slot;

first and second door panels having respective pivot shafts supported by the bearings of the frame such that the pivot shafts can rotate about axes thereof, the first and second door panels being supported by the frame such that they can swing about the respective pivot shafts between closed positions in which the first and second door panels are situated in a single plane and close the insertion port, and open positions in which the first and second door panels open the insertion port, the first and second door panels being situated in the respective closed positions when the PC card is not inserted in the card slot, and the first and second door panels being swung apart in opposite directions when the PC card is inserted into the card slot to thereby shift the first and second door panels from the respective closed positions to the respective open positions; and a spring urging the first and second door panels toward the respective closed positions, wherein the bearings of the frame have respective cylindrical hollow bosses in which the pivot shafts are inserted such that they can rotate about axes thereof; and the spring includes first and second coil sections mounted on a circumference of the bosses, arm sections each extending from one end of a corresponding one of the first and second coil sections and urging the first and second door panels toward the respective closed positions, and a connecting section bridging another end of each of the first and second coil sections.

* * * * *